Patented Jan. 10, 1928.

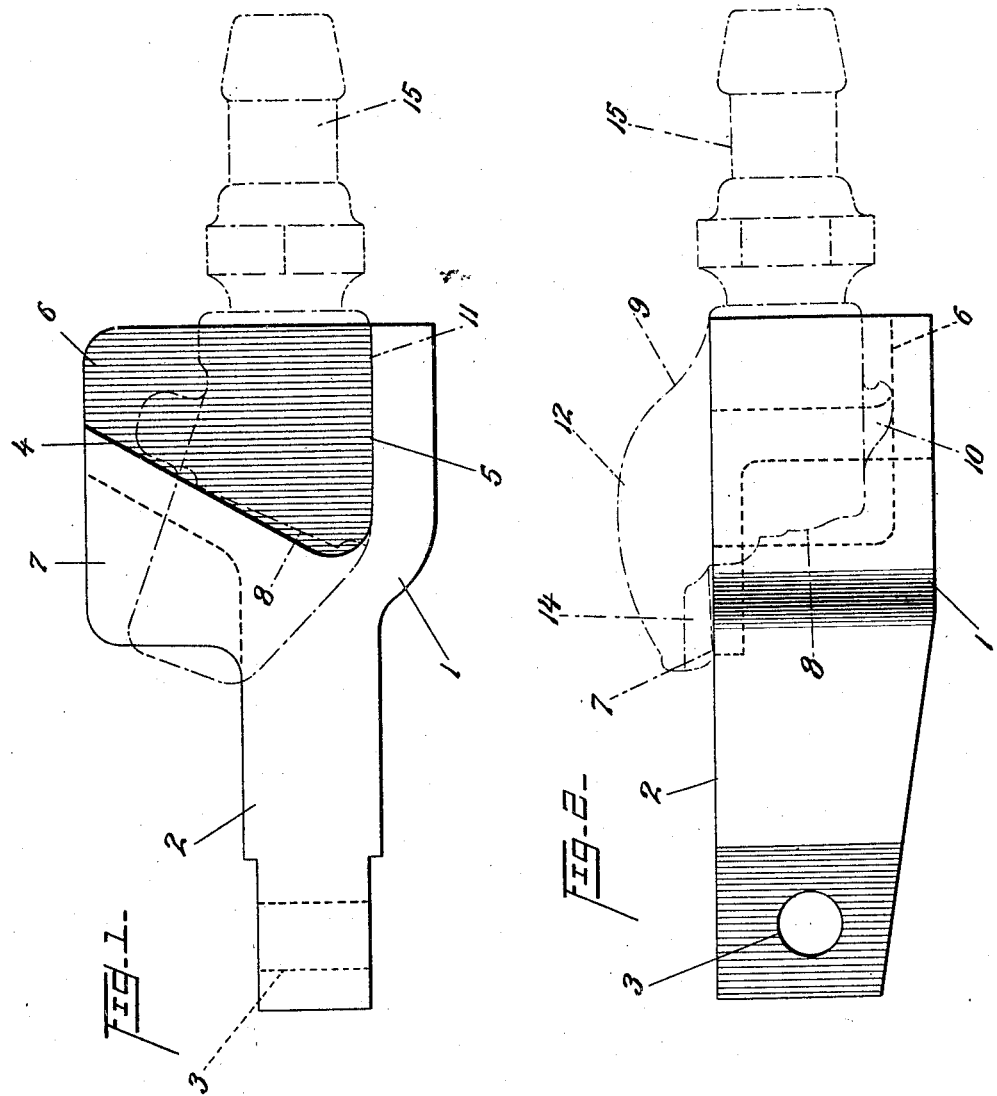

1,655,643

UNITED STATES PATENT OFFICE.

AMOS B. RUMSEY, OF COVINGTON, VIRGINIA, ASSIGNOR TO COVINGTON MACHINE COMPANY, INC., OF COVINGTON, VIRGINIA, A CORPORATION OF VIRGINIA.

STEAM-HOSE COUPLING-ASSEMBLING HEAD.

Application filed February 6, 1925. Serial No. 7,321.

This invention relates to tools for assembling steam hose types of couplings on steam hose and also to a method of assembling such couplings on steam hose, and comprises all improvements disclosed in this application. The primary object is to provide a simple head and method, whereby steam hose types of couplings can be assembled on hose by a simple straight line motion of the head without the use of any special latch for holding the coupling on the head, and without having to move the coupling laterally to release it from the head.

The above and other objects which will hereinafter appear, are attained by new and useful improvements as disclosed in this application. To enable others skilled in the art to fully understand the essential features of the improvements, drawings have been annexed as a part of this disclosure.

Fig. 1 is a top plan view of the assembling head with a steam hose coupling having its position thereon indicated by a dot and dash outline.

Fig. 2 is a front elevation of Fig. 1.

The head comprises a body portion 1 having an attaching portion 2 provided with a hole 3 adapted for attachment to a carrier or slide similar to the way the assembling tool shown in Fig. 20 of Patent 1,252,676 is intended to be attached for operation in a horizontal direction.

Body portion 1 has a recess formed by vertical pushing surface 4, lateral guide or aligning surface 5 and horizontal supporting surface 6. In the same plane with the top of the assembling head is a horizontal supporting or guide surface 7 which extends rearwardly from surface 4. Pushing surface 4 extends at an angle to suit the angle of surface 8 of the steam hose coupling 9. Aligning or guide surface 5 extends in the general direction of movement of the assembling head.

In operation, with the head connected to a carrier and with a hose clamped in position as disclosed in Patent 1,252,676, a coupling 9 is placed with its lower locking lug or flange 10 resting on supporting surface 6, with its surface 8 against pushing surface 4, and with its side 11 against aligning surface 5. The operator places his hand on back 12 of the coupling and presses down until the upper locking lug or flange 14 rests on guide or supporting surface 7. The neck 15 of the coupling now extends in a general direction toward the hole in the hose with which it is to be assembled. But preferably the difference in height of surfaces 6 and 7 is such that the neck 15 is a little raised above its proper position. This is to permit the operator to rock the center line of the neck of the coupling slightly above and below the normal average center line of the hose opening in order to take care of variations in the difference of height between the locking lugs of different couplings and variations in position of the hose opening of different hose.

With the operator's hand on the coupling as described, the carrier is moved forward to push the neck 15 of the coupling into the hose. Meanwhile, by means of his hand on the top 12 of the coupling, the operator aids neck 15 to align properly with the hole in the hose. As pushing surface 4 is at an angle to the line of movement of the head, the thrust of surface 4 against surface 8 of the coupling as neck 15 enters the hose, forces surface 11 of the coupling firmly against aligning surface 5 of the head. As soon as the neck 15 is pushed into the hose, the operator removes his hand. Then the direction of the carrier or slide is reversed and the head slides freely away from the coupling, leaving it in position in the hose.

All changes which properly come within the spirit and range of equivalency of the following claims are intended to be embraced within the scope of the claims.

I claim:

1. A coupling assembling head for train hose couplings of the steam type having locking lugs, comprising, a body portion having a forward supporting surface designed to support a locking lug, a higher rearward supporting surface designed to support another locking lug, and a pushing surface intermediate said forward and rearward supporting surfaces.

2. The coupling assembling head set forth in claim 1 in which the pushing surface is substantially vertical.

3. A coupling assembling head for train hose couplings of the steam type having locking lugs, comprising, a body portion having a forward supporting surface designed to support a locking lug, a higher rearward supporting surface designed to support another locking lug, a lateral guide surface, and a pushing surface intermediate said forward and rearward supporting surfaces.

4. The coupling assembling head set forth in claim 4 in which the pushing surface makes an acute angle with the guide surface.

5. The coupling assembling head set forth in claim 4 in which the pushing surface is substantially vertical and makes an acute angle with the lateral guide surface.

6. The coupling assembling head set forth in claim 4 in which the rearward supporting surface is at least as high as the top of the pushing surface.

AMOS B. RUMSEY.

CERTIFICATE OF CORRECTION.

Patent No. 1,655,643. Granted January 10, 1928, to

AMOS B. RUMSEY.

It is hereby certified that error appears in the printed specification of the above numbered patent requiring correction as follows: Page 2, lines 4, 8 and 12, claims 4, 5 and 6, for the numeral "4" read "3"; and that the said Letters Patent should be read with this correction therein that the same may conform to the record of the case in the Patent Office.

Signed and sealed this 31st day of January, A. D. 1928.

Seal.

M. J. Moore,
Acting Commissioner of Patents.